United States Patent [19]
Shimoda

[11] Patent Number: 6,060,869
[45] Date of Patent: May 9, 2000

[54] POWER SUPPLY CIRCUIT

[75] Inventor: Sadashi Shimoda, Chiba, Japan

[73] Assignee: Seiko Instruments Inc., Japan

[21] Appl. No.: 09/191,886

[22] Filed: Nov. 13, 1998

[30] Foreign Application Priority Data

Mar. 3, 1998 [JP] Japan .................................. 10 051166

[51] Int. Cl.[7] .................................................. G05F 1/40
[52] U.S. Cl. .............................................................. 323/271
[58] Field of Search ..................... 323/268, 222, 323/272, 271; 307/44, 45

[56] References Cited

U.S. PATENT DOCUMENTS

| | | | |
|---|---|---|---|
| 4,626,766 | 12/1986 | Musil | 323/222 |
| 5,412,308 | 5/1995 | Brown | 323/267 |

*Primary Examiner*—Shawn Riley
*Attorney, Agent, or Firm*—Adams & Wilks

[57] ABSTRACT

A power supply circuit for supplying power which may be used to drive a liquid crystal display unit in a multiline addressing scheme, in which drive voltages VH, VL and Vi on the common side of the liquid crystal display unit can satisfy the relationship VH−Vi=Vi−Vt with high accuracy, comprises a switching regulator for generating a first output voltage of a first polarity, a resistor connected to the first switching regulator to divide the first output voltage and produce a divided output voltage, and a second, constant-voltage power supply circuit which includes an error amplifier that inputs the divided output voltage as one of a supply voltage and a reference voltage and which generates a second output voltage opposite in polarity to the first polarity so that a constant relationship is maintained between the first and second output voltages.

49 Claims, 3 Drawing Sheets

POWER SUPPLY CIRCUIT

BACKGROUND OF THE INVENTION

1. Field of the Invention

The present invention relates to a power supply circuit for driving a liquid crystal display unit, and more particularly to a power supply circuit for supplying a voltage at a common side.

2. Description of the Related Art

As a conventional power supply circuit for driving a liquid crystal display unit, there is known a power supply circuit employing a switching regulator as shown in a circuit diagram of FIG. 4. That is, there has been obtained positive and negative power supply voltages necessary for use as a drive voltage at a common side using a switching regulator and a transformer.

In a liquid crystal display unit using a drive method such as multi-line addressing (MLA), a voltage relationship of VH, VL and V1 which are drive voltages on the common side satisfies the relation VH−V1=V1−VL, as shown in FIG. 3. When this relationship is not satisfied, a residual image is produced on a display screen, thereby causing deterioration of display quality. However, in the conventional power supply circuit, because the accuracy in winding ratio of the transformer is difficult to obtain, there arises a problem that it is difficult to satisfy the above equality.

SUMMARY OF THE INVENTION

An object of the present invention is to solve the above problem.

In order to solve the above problem, according to the present invention, there is provided a power supply circuit having two constant-voltage power supply circuits that generate output voltages different in polarity from each other, and in which an output voltage Va of one constant-voltage power supply circuit is divided by a resistor, and a voltage Vb thus divided, or a voltage resulting from buffering the divided voltage Vb, is set as a reference voltage of the other constant-voltage power supply circuit that generates an output voltage Vc, thereby realizing a power supply circuit that satisfies a relationship of Va−Vb=Vb−Vc with high accuracy.

The power supply circuit according to the present invention can be made up of a constant-voltage power supply circuit that generates an output voltage of a first polarity; a resistance element connected to an output of the constant-voltage power supply circuit to divide the output voltage; and a slave-side constant-voltage power supply circuit which includes an error amplifier that inputs the voltage divided by the resistant element as a reference voltage and which generates a second output voltage opposite in polarity to the first polarity. In this structure, the slave-side constant-voltage power supply circuit can be made up of a switching regulator.

Also, the power supply circuit according to the present invention can be made up of a constant-voltage power supply circuit that generates an output voltage of a first polarity; a resistance element connected to an output of the constant-voltage power supply circuit to divide the output voltage; a slave-side constant-voltage power supply circuit that inputs the voltage divided by the resistance element as its supply voltage and generates a second output voltage opposite in polarity to the first polarity, which is a charge pump type switching regulator.

In the power supply circuit of the above structure, the constant-voltage power supply circuit that generates the output voltage of the first polarity can be made up of a switching regulator.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

The present invention is made up of two switching regulators, in which an output voltage of one switching regulator is divided by a resistor, and the divided voltage or a voltage resulting from buffering the divided voltage is set as a reference voltage of the other switching regulator.

Figure 1:
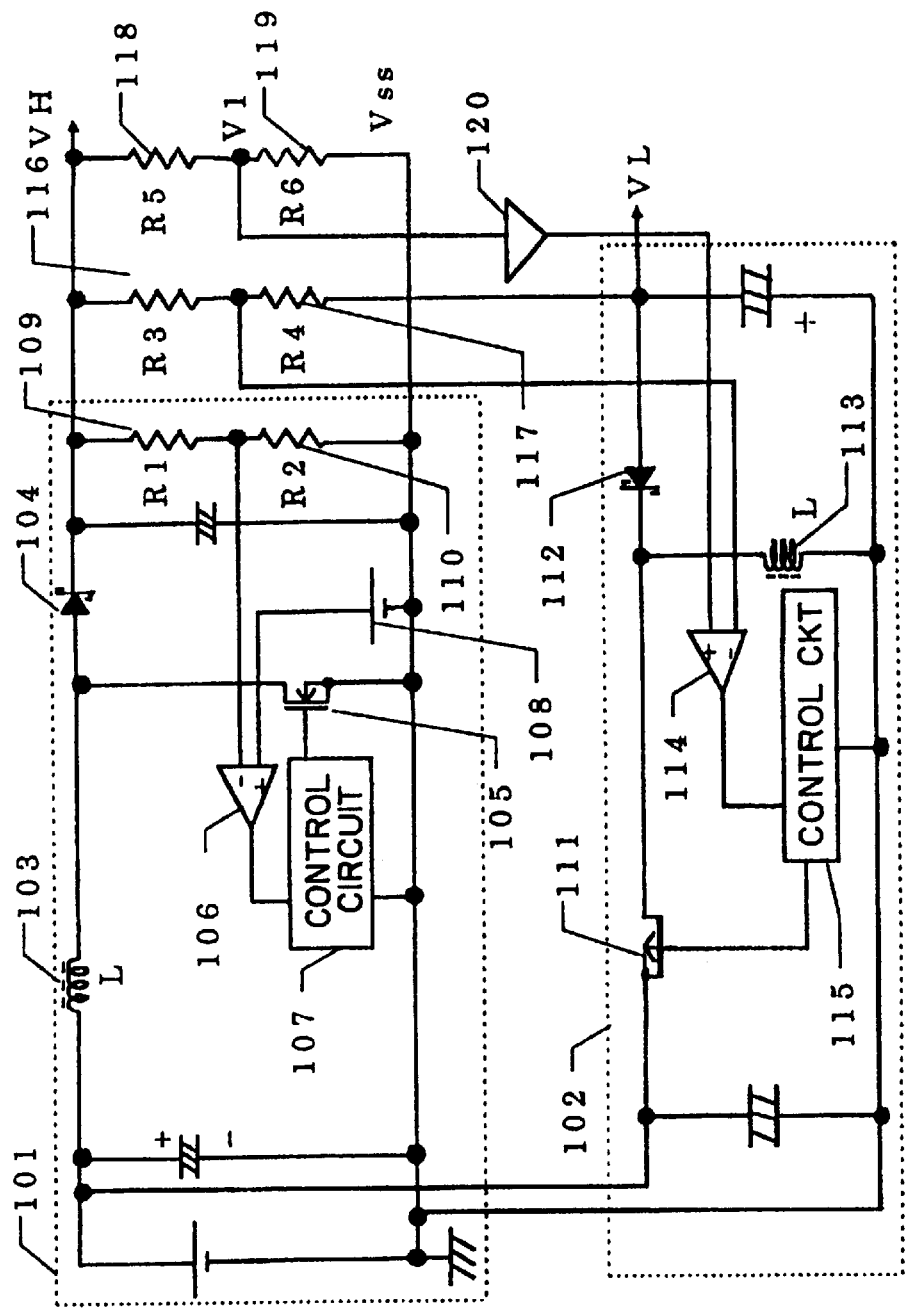
FIG. 1 is a block diagram showing a power supply circuit according to a first embodiment of the present invention.
Figure 3:
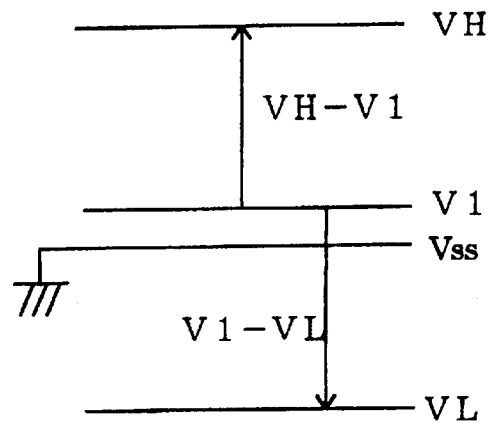
FIG. 3 is an explanatory diagram showing a common-side drive voltage of a liquid crystal display unit.

FIG. 1 is a diagram showing a power supply circuit according to a first embodiment of the present invention. A step-up type switching regulator 101 and a reverse type switching regulator 102 produce voltages VH, V1 and VL shown in FIG. 3, respectively. The step-up switching regulator 101 is made up of an inductor 103, a diode 104, an FET 105, an error amplifier 106, a control circuit 107, a reference voltage 108 and feedback resistors 109, 110. This is a circuit which has been known as a step-up chopper type switching regulator. Also, the reverse type switching regulator 102 is made up of an FET 111, a diode 112, an inductor 113, an error amplifier 114, a control circuit 115 and feedback resistors 116, 117. This is a circuit which has been known as a reverse chopper type switching regulator. Also, the voltage VH is divided by divider resistors 118 and 119, and a voltage V1 shown in FIG. 3 is produced from their connecting point. Further, the voltage V1 is inputted to a positive side terminal of the error amplifier 114 through a buffer circuit 120.

Then, the operation will be described. The voltage VH developed by the step-up type switching regulator 101 is determined as indicated by expression (1) according to a voltage value Vref of the reference voltage 108, a resistance value R1 of the feedback resistor 109, and a resistance value R2 of the feedback resistor 110.

$$VH = Vref \cdot (R1+R2)/R2 \qquad (1)$$

Also, the voltage V1 is determined as indicated by expression (2) according to a resistance value R5 of the divider resistor 118 and a resistance value R6 of the divider resistor 119.

$$V1 = VH \cdot R6/(R5+R6) \qquad (2)$$

Because an impedance of the voltage V1 is converted by a buffer 120, and the same voltage V1 is inputted to the positive side terminal of the error amplifier 114, the voltage VL produced by the reverse type switching regulator 102 is determined as indicated by expression (3) since one end of the feedback resistor 116 is connected to the voltage VH.

$$VL = -(VH-V1) \cdot R4/R3 + V1 \qquad (3)$$

Figure 4:
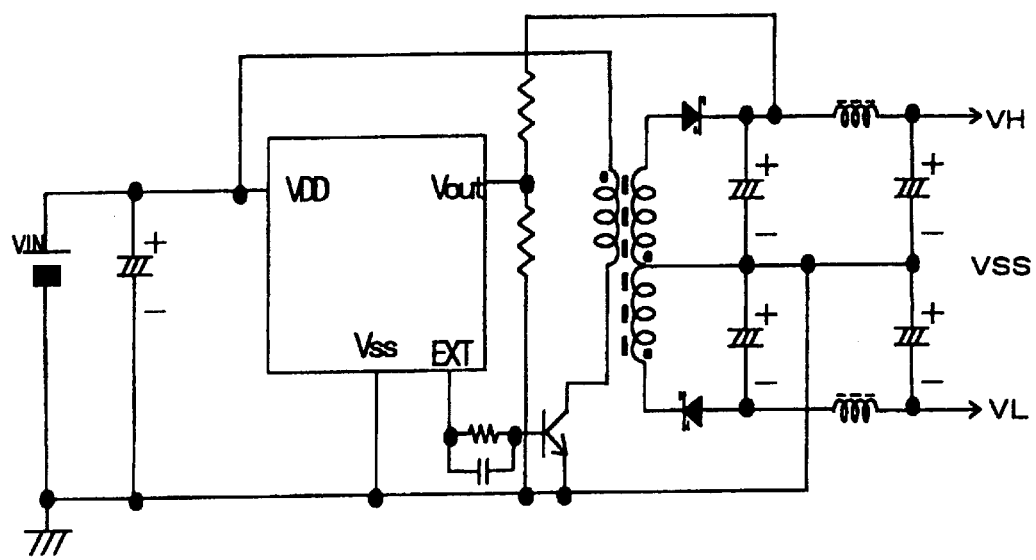
FIG. 4 is a block diagram showing a conventional power supply circuit.

Here, R3 is a resistance value of the feedback resistor 116, R4 is a resistance value of the feedback resistor 117, and if they are set so as to satisfy R3=R4, the voltage VL is equivalent to −VH+2V1. That is, the relationship of VH−V1=V1−VL can be satisfied. Further, in both of the step-up type switching regulator 101 and the reverse type switching regulator 102, if R3 and R4 are integrated, R3=R4 can be satisfied with high accuracy. Therefore, the relation of VH−V1=V1−VL can be satisfied with an error of about 0.1%. This is a value which cannot be obtained by a power supply circuit using the transformer shown in FIG. 4.

Further, there is a case in which the voltage value of VH is set to be variable in order to adjust contrast in the liquid crystal display unit. In this case, in the circuit shown in FIG. 1, this object is achieved by varying a resistance value of R1 or R2. In this situation, the voltage VL must be also varied in association. The circuit structure of FIG. 1 enables this variation because the voltage VL is produced from the voltage VH. Also, although the buffer circuit 120 is used in FIG. 1, if the resistance values of the divider resistors 118 and 119 are lower than an input impedance of the error amplifier 114, the buffer circuit 120 may be omitted. Moreover, although the voltage V1 is produced from the voltage VH by the divider resistors in FIG. 1, even if the voltage V1 is supplied from another power supply without being limited to this structure, the relation of VH−V1=V1−VL can be satisfied with high accuracy, which is one of the objects of the present invention.

Furthermore, the circuit of FIG. 1 is arranged in such a manner that the voltage VH is produced by the step-up type switching regulator 101, and thereafter the voltage VL is produced by the reverse type switching regulator 102. Alternatively, in order to achieve the object of the present invention, the circuit may be arranged in such a manner the voltage VL is produced by the reverse type switching regulator 102, and thereafter the voltage VH is produced by the step-up type switching regulator 101. In this case, the reference voltage 108 is applied to the error amplifier 114 of the reverse type switching regulator 102, and the voltage V1 which is applied from another power supply or the like is used for the reference voltage of the step-up type switching regulator 101.

Also, in the present invention, since means for stepping up or reversing a voltage is not essential, the same effect is obtained even if both of the reverse type switching regulator and the step-up type switching regulator are made up of charge pump type switching regulators.

Figure 2:
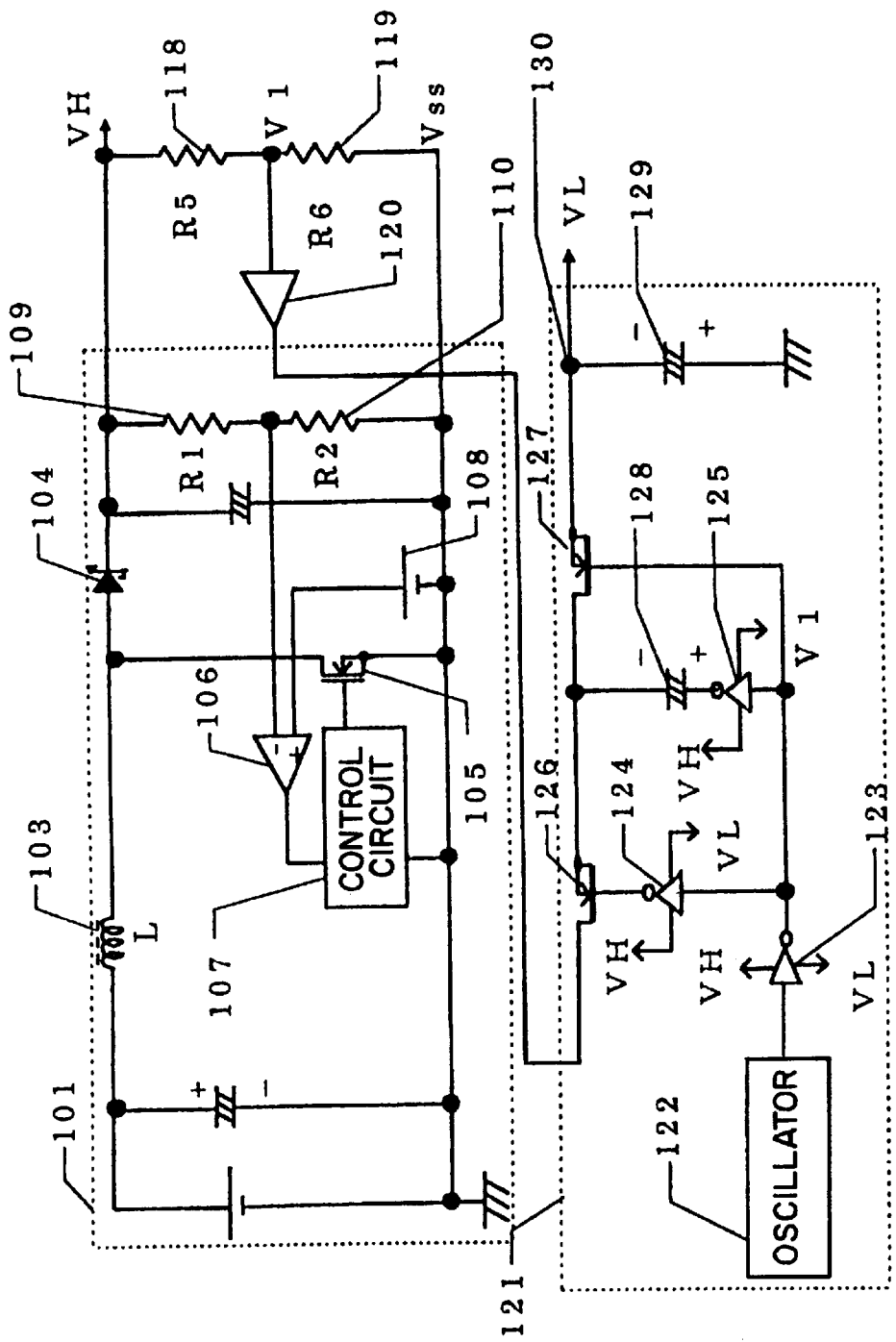
FIG. 2 is a block diagram showing a power supply circuit according to a second embodiment of the present invention.

FIG. 2 is a diagram of a power supply circuit according to a second embodiment of the present invention. Voltages VH, V1 and VL shown in FIG. 3 are developed by a step-up type switching regulator 101 and a charge pump type switching regulator 121, respectively. The step-up switching regulator 101 is made up of an inductor 103, a diode 104, an FET 105, an error amplifier 106, a control circuit 107, a reference voltage 108 and feedback resistors 109, 110. Also, the charge pump type switching regulator 121 is made up of an oscillator circuit 122, inverters 123, 124, 125, FETs 126, 127 and capacitors 128, 129. Also, the voltage VH is divided by divider resistors 118 and 119, and the voltage V1 shown in FIG. 3 is produced from their connecting point. Further, the voltage V1 is used as an input supply voltage of the charge pump type switching regulator through a buffer circuit 120, and also used as a supply voltage of the inverter 125. The supply voltage of other inverters is applied from VH and VL.

Subsequently, the operation will be described. The voltage VH developed by the step-up type switching regulator 101 is determined as indicated by expression (4) according to a voltage value Vref of the reference voltage 108, a resistance value R1 of the feedback resistor 109, and a resistance value R2 of the feedback resistor 110.

$$VH = Vref \cdot (R1+R2)/R2 \qquad (4)$$

Also, the voltage V1 is determined as indicated by expression (5) according to a resistance value R5 of the divider resistor 118 and a resistance value R6 of the divider resistor 119.

$$V1 = VH \cdot R6/(R5+R6) \qquad (5)$$

An impedance of the voltage V1 is converted by the buffer 120, and the same voltage V1 is used as the input supply voltage of the charge pump type switching regulator 121. The oscillator circuit 122 outputs a square wave so that the square waves VH and VL in amplitude are outputted to an output of the inverter 123. If the output of the inverter 123 outputs the voltage VL, an output of the inverter 124 becomes VH to turn on the FET 126. In response to this, the voltage V1 charges up one side of the capacitor 128. An output of the inverter 125 outputs the voltage VH at the same time, as a result of which the voltage of VH−V1 is charged up in the capacitor 128. In this situation, the FET 127 is off. Then, when the output of the inverter 123 outputs the voltage VH, the output of the inverter 124 becomes VL, thereby to turn off the FET 126. Instead, the FET 127 is turned on. As a result, the charges in the capacitor 128 are transferred to the capacitor 129. In this situation, because the positive side voltage of the capacitor 128 becomes the voltage V1 due to the inverter 125, the voltage VL developed by the charge pump type switching regulator 121 is determined as indicated by expression (6).

$$VL = -(VH-V1) + V1 \qquad (6)$$

In other words, the voltage VL becomes a voltage resulting from turning up a voltage difference (VH−V1) toward the negative side with the voltage V1 as a reference. For this reason, the relation of VH−V1=V1−VL can be satisfied. Because in order to develop the voltage VL, in this embodiment, the voltage VL is obtained by a voltage turned up on the negative side using the charge pump type switching regulator, the relation of VH−V1=V1−VL can be satisfied with an error of about 0.5%. This is a value which cannot be obtained by the power supply circuit using the transformer shown in FIG. 4.

Also, although the buffer circuit 120 is used in FIG. 1, if the resistance values of the divider resistors 118 and 119 are lower than the input impedance of the error amplifier 114, the buffer circuit 120 may be omitted. Moreover, in the case where the charge pump type switching regulator 121 cannot start because no voltage VL is developed at an initial starting time, a diode having a terminal 130 as a cathode is connected between the output of the buffer circuit 120 and the voltage VL terminal 130 to start the charge pump type switching regulator 121. This embodiment was described using the charge pump type switching regulator having the circuit structure as indicated by reference numeral 121. However, the circuit structure per se is not limited to or by this circuit. Furthermore, although the voltage V1 is produced from the voltage VH by the divider resistors in FIG. 2, even if the voltage V1 is applied from another power supply without being limited to the above structure, the relation of VH−V1=V1−VL can be satisfied with high accuracy which is one of the objects of the present invention.

Further, the circuit of FIG. 2 is arranged in such a manner that the voltage VH is produced by the step-up type switching regulator 101, and thereafter the voltage VL is produced by the charge pump type switching regulator 121. The object of the present invention is achieved even when the voltage VL is produced by use of the reverse type switching regulator 102 described in the first embodiment, and thereafter the voltage VH is produced by the charge pump type switching regulator that can step up a voltage on the positive side twice as large as that on the negative side. In this case, the voltage V1 applied from another power supply or the like may be used for the input supply voltage of the charge pump type switching regulator.

Further, in the present invention, since means for stepping up or reversing a voltage is not essential, the same effect is obtained even if both of the reverse type switching regulator and the step-up type switching regulator are made up of charge pump type switching regulators.

As described above, according to the present invention, there is realized a power supply circuit structured in such a manner that using two constant-voltage power supply circuits that develop output voltages different in polarity from each other, the output voltage Va of one constant-voltage power supply circuit is divided by a resistor, and the divided voltage Vb or a voltage resulting from buffering the divided voltage Vb becomes the reference voltage of the other constant-voltage power supply circuit that generates the output voltage Vc. Accordingly, there is advantageous in that the power supply circuit can be realized inexpensively which satisfies the relation of Va−Vb=Vb−Vc with high accuracy.

The foregoing description of the preferred embodiments of the invention has been presented for purposes of illustration and description. It is not intended to be exhaustive or to limit the invention to the precise form disclosed, and modifications and variations are possible in light of the above teachings or maybe acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A power supply circuit comprising: a first switching regulator for producing a first output voltage; and a second switching regulator for producing a second output voltage; wherein the first output voltage produced by the first switching regulator and a voltage applied from a power source are supplied to the second switching regulator to produce the second output voltage.

2. A power supply circuit comprising: a first switching regulator for producing a first output voltage; a second switching regulator for producing a second output voltage; and a resistor divider for dividing the first output voltage of the first switching regulator and producing a divided output voltage; wherein the divided output voltage is supplied as a reference voltage to the second switching regulator.

3. A power supply circuit comprising: a first switching regulator for producing a first output voltage; a second switching regulator for producing a second output voltage; and a resistor divider for dividing the first output voltage regulator and producing a divided output voltage, the divided output voltage being supplied as a supply voltage to the second switching regulator; and wherein the second switching regulator comprises a charge pump type switching regulator.

4. A power supply circuit, comprising:
a constant-voltage power supply circuit for generating a first output voltage having a first polarity;
a resistor connected to an output of the constant-voltage power supply circuit for dividing the first output voltage and producing a divided output voltage; and
a slave-side constant-voltage power supply circuit including an error amplifier receptive of the divided output voltage as a reference voltage and which generates a second output voltage opposite in polarity to the first polarity.

5. A power supply circuit according to claim 4; wherein the slave-side constant-voltage power supply circuit is a switching regulator.

6. A power supply circuit comprising:
a constant-voltage power supply circuit for generating a first output voltage having a first polarity;
a resistor connected to an output of the constant-voltage power supply circuit for dividing the first output voltage and producing a divided output voltage; and
a slave-side constant-voltage power supply circuit comprising a charge pump type switching regulator for receiving the divided output voltage as a supply voltage and generating a second output voltage opposite in polarity to the first polarity.

7. A power supply circuit according to any one of claims 4 to 6; wherein a relation of the first output voltage Va output by the constant-voltage power supply circuit, the divided output voltage Vb and the second output voltage Vc output by the slave-side constant-voltage power supply circuit approximately satisfies a relation of Va−Vb=Vb−Vc.

8. A power supply circuit according to claim 1; wherein the power supply voltage supplied to the second switching regulator from the power supply is also supplied as a power supply voltage to the first switching regulator.

9. A power supply circuit according to claim 1; wherein the first switching regulator is a step-up type switching regulator and the second switching regulator is a reverse type switching regulator.

10. A power supply circuit according to claim 1; further comprising a resistor divider circuit for dividing the output voltage of the first switching regulator and producing a divided output voltage; and wherein the divided output voltage is supplied to the second switching regulator.

11. A power supply circuit according to claim 10; wherein a relation of the first output voltage Va output by the first switching regulator, the divided output voltage Vb, and the second output voltage Vc output by the second switching regulator approximately satisfies the relationship Va−Vb=Vb−Vc.

12. A power supply circuit according to claim 10; further comprising a buffer for buffering the divided output voltage and producing a buffered output voltage which is supplied to the second switching regulator.

13. A power supply circuit according to claim 1; wherein at least one of the first and second switching regulators comprises a chopper type switching regulator.

14. A power supply circuit according to claim 1; wherein at least one of the first and second switching regulators comprises a reverse type switching regulator.

15. A power supply circuit according to claim 1; wherein at least one of the first and second switching regulators comprises a charge pump type switching regulator.

16. A power supply circuit according to claim 1; wherein the level of the output voltage of the second switching regulator varies by the same percentage as a variation in the output voltage of the first switching regulator.

17. A power supply circuit according to claim 1; wherein the first switching regulator comprises a power source, an inductor connected in series with the power source, a diode having a first terminal connected in series with the inductor, a transistor having one of a source and a drain connected between the inductor and the diode, a first feedback resistor connected to a second terminal of the diode, an error amplifier having a first input connected to the first feedback resistor and a second input connected to a reference voltage, and a control circuit connected to an output of the error amplifier and having an output connected to a gate of the transistor for controlling the transistor so that the first output voltage is regulated.

18. A power supply circuit according to claim 17; wherein the first feedback resistor comprises a variable resistor.

19. A power supply circuit according to claim 17; wherein the second switching regulator comprises an FET having one of a source and a drain connected to power source, a diode having a first terminal connected to the other one of the source and drain of the FET, an inductor having a first terminal connected between the FET and the diode, a second feedback resistor connected at a first terminal to receive the first output voltage, an error amplifier having a first input connected to a second terminal of the second feedback resistor, a voltage divider resistor having a first terminal connected to receive the first output voltage and a second terminal connected to a second input of the error amplifier, and a control circuit connected to an output of the error amplifier and having an output connected to a gate of the FET for controlling the FET so that the second output voltage is regulated.

20. A power supply circuit according to claim 1; wherein the value of the second output voltage varies in accordance with a variation in the first output voltage of the first switching regulator.

21. A power supply circuit according to claim 1; wherein a constant relationship is maintained between the first and second output voltages.

22. A power supply circuit according to claim 2; wherein the value of the second output voltage varies in accordance with a variation in the first output voltage of the first switching regulator.

23. A power supply circuit according to claim 2; wherein a constant relationship is maintained between the first and second output voltages.

24. A power supply circuit according to claim 2; wherein a relation of the first output voltage Va output by the first switching regulator, the divided output voltage Vb, and the second output voltage Vc output by the second switching regulator approximately satisfies the relationship Va−Vb= Vb−Vc.

25. A power supply circuit according to claim 3; wherein the value of the second output voltage varies in accordance with a variation in the first output voltage of the first switching regulator.

26. A power supply circuit according to claim 3; wherein a constant relationship is maintained between the first and second output voltages.

27. A power supply circuit according to claim 3; wherein a relation of the first output voltage Va output by the first switching regulator, the divided output voltage Vb, and the second output voltage Vc output by the second switching regulator approximately satisfies the relationship Va−Vb= Vb−Vc.

28. A power supply circuit according to claim 4; wherein the value of the second output voltage varies in accordance with a variation in the first output voltage of the first switching regulator.

29. A power supply circuit according to claim 4; wherein a constant relationship is maintained between the first and second output voltages.

30. A power supply circuit according to claim 5; wherein the value of the second output voltage varies in accordance with a variation in the first output voltage of the first switching regulator.

31. A power supply circuit according to claim 5; wherein a constant relationship is maintained between the first and second output voltages.

32. A power supply circuit according to claim 6; wherein the value of the second output voltage varies in accordance with a variation in the first output voltage of the first switching regulator.

33. A power supply circuit according to claim 6; wherein a constant relationship is maintained between the first and second output voltages.

34. A power supply circuit comprising: a first power supply circuit for producing a first output voltage; and a second power supply circuit for producing a second output voltage; wherein the first output voltage is supplied as an input to the second power supply voltage and the second output voltage is generated in accordance with the first output voltage so that a relationship between the first and second output voltages is maintained constant.

35. A power supply circuit according to claim 34; wherein the first and second output voltages have opposite polarities.

36. A power supply circuit according to claim 34; wherein at least one of the first and second power supply circuits comprises a switching regulator.

37. A power supply circuit according to claim 34; wherein the level of the second output voltage is dependent upon the level of the first output voltage and an output voltage of a power supply.

38. A power supply circuit according to claim 37; wherein the voltage applied to the second power supply circuit from the power supply is also applied to the first power supply circuit.

39. A power supply circuit according to claim 34; wherein at least one of the first and second power supply circuits comprises a chopper type switching regulator.

40. A power supply circuit according to claim 34; wherein at least one of the first and second power supply circuits comprises a reverse type switching regulator.

41. A power supply circuit according to claim 34; wherein at least one of the first and second power supply circuits comprises a charge pump type switching regulator.

42. A power supply circuit according to claim 34; wherein the level of the second output voltage is dependent upon the level of the first output voltage and an output voltage of a power supply.

43. A power supply circuit according to claim 34; wherein the first power supply is a switching regulator comprising a power source, an inductor connected in series with the power source, a diode having a first terminal connected in series with the inductor, a transistor having one of a source and a drain connected between the inductor and the diode, a first feedback resistor connected to a second terminal of the diode, an error amplifier having a first input connected to the first feedback resistor and a second input connected to a reference voltage, and a control circuit connected to an output of the error amplifier and having an output connected to a gate of the transistor for controlling the transistor so that the first output voltage is regulated.

44. A power supply circuit according to claim 43; wherein the first feedback resistor comprises a variable resistor.

45. A power supply circuit according to claim 43; wherein the second power supply is a switching regulator comprising an FET having one of a source and a drain connected to a power source, a diode having a first terminal connected to the other one of the source and drain of the FET, an inductor having a first terminal connected between the FET and the diode, a second feedback resistor connected at a first terminal to receive the first output voltage, an error amplifier having a first input connected to a second terminal of the second feedback resistor, a voltage divider resistor having a first terminal connected to receive the first output voltage and a second terminal connected to a second input of the error amplifier, and a control circuit connected to an output of the error amplifier and having an output connected to a gate of the FET for controlling the FET so that the second output voltage is regulated.

46. A power supply circuit according to claim 45; further comprising a buffer for buffering the divided output voltage and producing a buffered output voltage which is supplied to the second power supply circuit.

47. A power supply circuit according to claim 34; further comprising a resistor divider for dividing an output voltage of the first power supply and producing a divided output voltage; wherein the divided output voltage is supplied as one of a reference voltage and a supply voltage to the second power supply so that the output voltage of the second power supply depends upon the output voltage of the first power supply.

48. A power supply circuit according to claim 47; wherein at least one of the first and second power supplies comprises a charge pump type switching regulator.

49. A power supply circuit according to claim 47; wherein a relation of the first output voltage Va of the first power supply circuit, the divided output voltage Vb, and the second output voltage Vc of the second power supply circuit approximately satisfies the relationship Va−Vb=Vb−Vc.

* * * * *